Oct. 4, 1927.
S. H. KNAPP
1,644,435
MILKING MACHINE
Filed Nov. 20, 1924    2 Sheets-Sheet 1
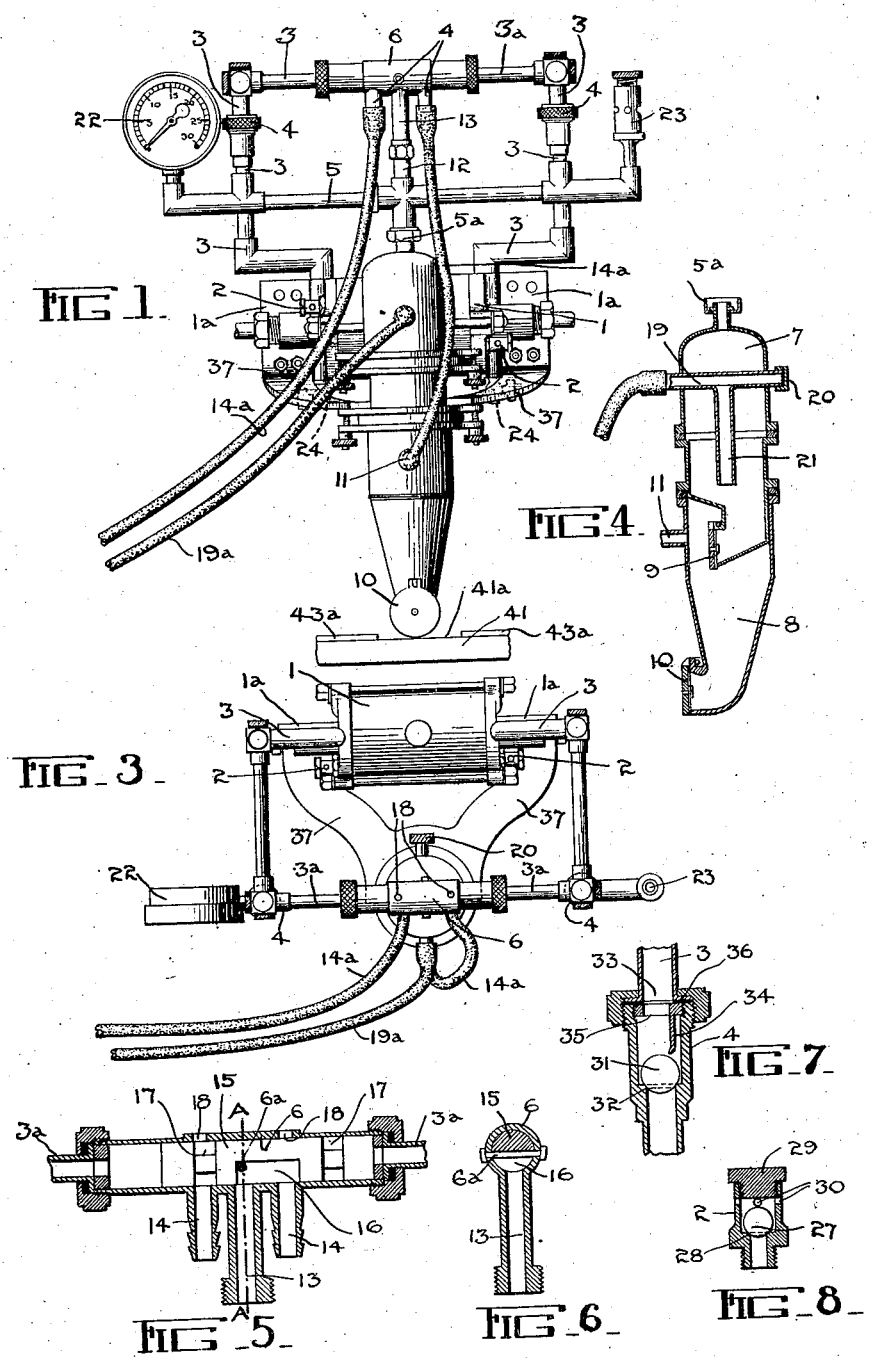
Inventor
S. H. Knapp
By Marks & Clerk

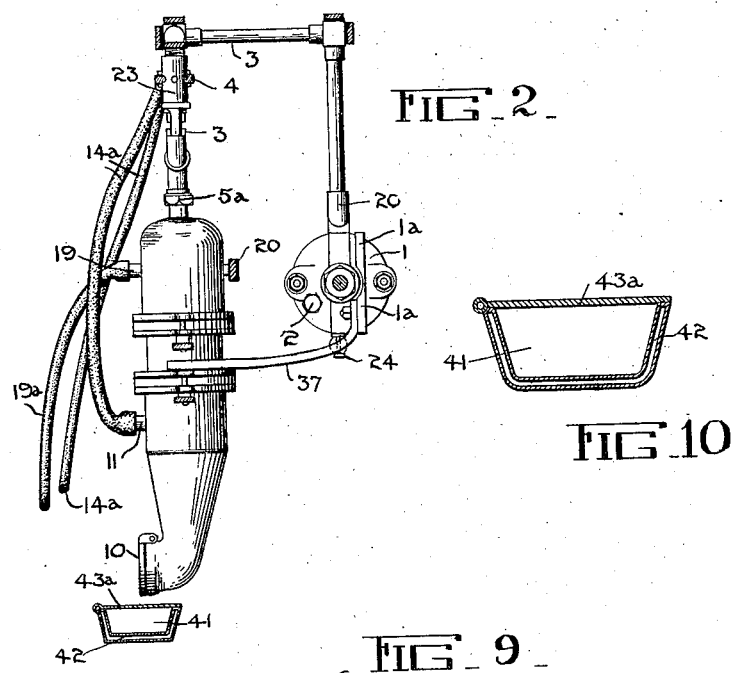
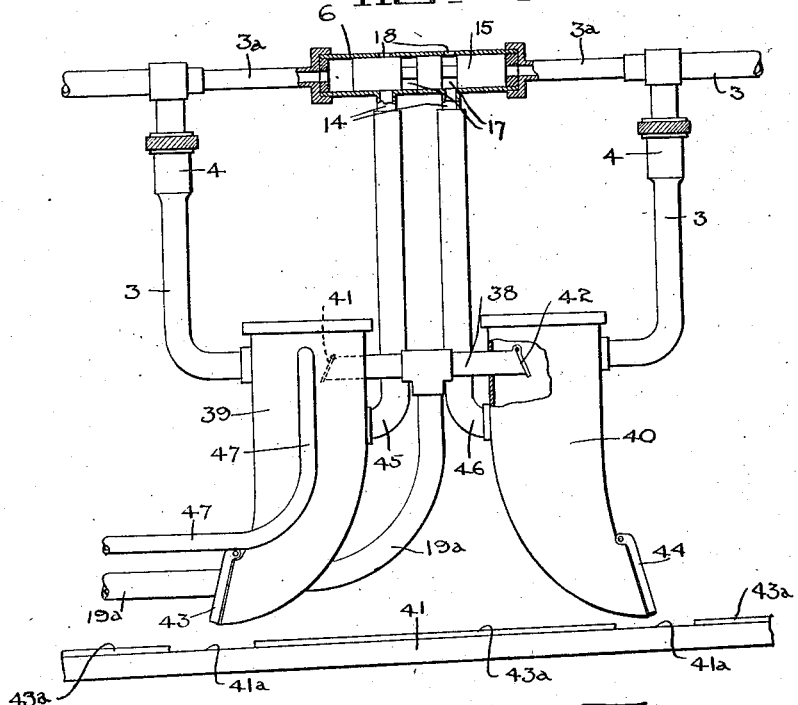

Patented Oct. 4, 1927.

1,644,435

UNITED STATES PATENT OFFICE.

SYDNEY HERBERT KNAPP, OF GREYTOWN, WELLINGTON, NEW ZEALAND, ASSIGNOR TO STANISLAUS JAMES MORAN, OF MASTERTON, NEW ZEALAND.

MILKING MACHINE.

Application filed November 20, 1924, Serial No. 751,158, and in New Zealand January 18, 1924.

This invention relates to milking machines and provides an improved machine of comparatively simple construction and operation, capable of being produced and maintained in efficient and sanitary working condition with a minimum of trouble.

The improved machine comprises a double acting vacuum pump each end of which is connected with a pulsator casing and the vacuum chamber of a double chambered or "spitting" milk releaser, the valve of the pulsator operating under the effects of both vacuum and compressed air at each stroke of the pump piston, the compressed air being prevented from entering the vacuum chamber of the releaser, by non-return valves located in the pipe lines from the pump to the releaser, between the latter and the pulsator.

The pulsator is double acting and is designed to create the pulsations in the outer spaces of the teat cups, necessary to ensure milking, and also to create pulsations in the lower chamber of the releaser, to permit the discharge of milk therefrom.

The improved machine will be more particularly described in conjunction with the accompanying drawings, wherein:

Figure 1 is a front elevation of the machile while

Figure 2 is a side elevation, and

Figure 3 a plan view thereof.

Figure 4 is a vertical section of the releaser

Figure 5 a longitudinal section of the pulsator and

Figure 6 a cross sectional view thereof on the line A—A, Figure 5.

Figure 7 a vertical section of one of the nonreturn valves used between the pulsator and releaser.

Figure 8 a vertical section of one of the pump exhaust valves,

Figure 9 a front elevation of a modified form of machine, and

Figure 10 a cross sectional view of the milk chute.

A double acting pump 1 operable by any suitable prime mover, and provided at each end with an exhaust valve 2 has connected at each end a pipe 3 in each of which is fitted a nonreturn valve 4.

Beyond the valves 4 (reading from the pump) the pipes 3 are connected together by a pipe 5, and before reaching the valves 4, said pipes 3 are connected together by a pulsator pipe and casing 6.

The pipe 5 is connected at 5ª with the vacuum chamber 7 of a releaser Figure 4 of the type having an upper chamber, the outlet from which to a lower chamber 8 is controlled by an inner flap valve 9 said lower chamber 8 being provided with an external flap valve 10 for controlling its outlet, and receiving pneumatic pulsations through the nipple 11.

The pipe 5 is also connected at 12 with a central nipple 13 on the pulsator casing 6.

Nipples 14 on the pulsator casing 6 one at each side of the nipple 13, are adapted to be connected preferably by means of flexible tubing 14ª one with the nipple 11 of the lower chamber 8 of the releaser, and the other with the outer or pulsation spaces of teat cups.

The pulsator casing 6 is open at its ends to the pipes 3 through connections 3ª and contains a pair of atmospheric ports 18. The valve 15 of the pulsator Figures 5 and 6 is formed with a central recess 16 in its under side, said recess being always over the nipple 13, and long enough to connect with the latter, either of the nipples 14.

Annular grooves 17 in the pulsator valve 15 near the ends thereof, are provided for the purpose of connecting the nipples 14 with the atmospheric ports 18, said grooves 17 being located so that whichever nipple 14 is not under vacuum through the recess 16 and nipple 13, is open to atmosphere through a groove 17 and port 18, the other groove 17 and port 18 in the meantime not registering with each other.

Milk from the teat cups is delivered under vacuum into the upper chamber 7 of the releaser through a preferably flexible pipe 19ª connected to one end of a pipe 19 which projects at both ends from the upper portion of the releaser, the other end of said pipe 19 being closed by a cap or the like 20 capable of being removed to facilitate cleaning of the pipe.

Milk entering the pipe 19 is delivered downwards to near the bottom of the upper chamber 7 and behind the valve 9, by a vertical pipe 21, the latter directing the milk well away from the vacuum connection 5ª thereby preventing any tendency of the milk to enter the connection 5ª besides which the delivery of the milk to behind the valve 9 facilitates its passage to the chamber 8 when the latter is also put under vacuum.

The pipes 3 are fitted with a vacuum gauge 22, and a vacuum relief valve 23 both located between the nonreturn valves 4 and the releaser while the pump is fitted at each end with a blowout cock 24.

The non-return valves 4 inserted in the pipes 3 between the pulsator and the releaser are constructed to lift and allow the suction side of the pump piston to always act in the pipe 5, the upper chamber 7 of the releaser and the recess 16 of the pulsator valve 15, so that said pipe chamber and recess are always under vacuum, no matter in what direction the pump piston is moving. On the other hand said valves 4 close under pressure and compressed air or pressure from the pressure side of the pump piston is prevented from passing to the pipe 5 and parts connected thereto, but is diverted into the connections 3ª to act upon the ends of the piston valve 15. Therefore while one pipe 3 and one end of the valve 15 are under vacuum, air is being compressed and forced through the other pipe 3 to behind the valve 15, the pressure never being admitted to the pipe 5 which is always under vacuum.

The operation of the pulsator valve 15 is thereby made positive, decided and rapid in its action, with the result that sharp and well defined pulsations are created for transmission through the flexible pipes 14ª to the outer spaces of the teat cups and also to the lower chamber 8 of the releaser.

The valve 15 is maintained in its correct position or is prevented from turning in the casing 6 by a pin 6ª inserted crossways through the latter, just below the flat under surface or top of the recess 16 (Figure 6).

The exhaust valves 2 permit the escape to atmosphere of pressure in excess of that required to assist in the operation of the pulsator valve 15.

The valves 2 need not necessarily be fitted on the pump 1 but can be located on the ends of the pulsator casing 6 or in the pipes 3, anywhere between the pump and the pulsator.

The valves 2 (Figure 8) are made smaller than the nonreturn valves 4 to ensure their rapid closing when on the exhaust side of the pump piston and in a convenient form each consists of a ball 27 fitted within a casing formed with a seating 28 on which the ball 27 closes under suction said casing being closed at its outer end by a plug 29 and containing air escape ports 30.

A convenient form of nonreturn valve 4 (Figure 7) comprises a casing containing a ball 31 adapted to close on a seating 32 under pressure from the pump 1, said ball being prevented from closing the outlet 33 from the casing when the pipe 3 is under vacuum, by projections 34 from a ring 35 held between the coupling nut 36 and the casing.

The pump 1 is provided with lugs 1ª by means of which it may be secured to an upright, wall or other supporting member a bracket 37 being provided for supporting the releaser.

In the form of machine shown in Figure 9 two releasers are employed the latter when the machine is in use receiving milk alternately from same set of teat cups.

In this form of machine the flexible pipe 19ª which conveys the milk from the teat cups, is connected to a pipe 38 located between two separate releasers 39, 40 to each of which is connected a pipe 3 from one end of the pump 1, said pipes 3 being connected by the pulsator pipe or casing 6 and being fitted with the nonreturn valves 4 as before. The ends of the pipe 38 project into the releasers 39, 40 and are bevelled or inclined and have resting thereon pivoted valves 41, 42, lower external flap valves 43, 44 being also provided to each releaser.

The pulsator valve 15 in the form of machine shown in Figure 9, is made without the central vacuum recess 16, the annular grooves 17 being used as before to admit air to the nipples 14 from the air ports 18, said nipples 14 being in this case connected through connections 45 and 46 one with the releaser 39 and the other with the releaser 40.

The pulsations to the outer spaces of the teat cups are transmitted from either of the releasers 39, 40 through a preferably flexible pipe 47.

In operation the pipes 19ª and 38 are always under vacuum with one of the releasers 39, 40 through a pipe 3, whichever of the releasers is connected with the pipe 3 receiving pressure from the pump, being opened to atmosphere through either the pipe 45 or 46, while the nonreturn valve 4 in said pipe 3 receiving pressure is closed under the latter.

Each releaser 39, 40 is therefore alternately put under vacuum by the pump 1 through a pipe 3 and nonreturn valve 4, and opened to air through either pipe 45 or 46 and the pulsator, a vacuum being maintained in the pipes 38 and 19ª. The milk drawn from the teat cups discharges from the releasers 39, 40 alternately.

The milk discharges from the releaser shown in Figures 1 and 2, or the releasers shown in Figure 9 into a chute 41 preferably water jacketed as at 42 and provided with a hinged cover 43ª, openings 41ª being provided in the latter to allow the milk to enter the chute.

A pump, releaser, and pulsator connected and operated as described, are provided in respect of each set of teat cups, the pumps being driven by the same operating means and the releasers discharging into a common chute.

The whole apparatus is so compact that if necessary it may readily be moved set up and operated in a number of cow bails in succession.

The various pipe lines are provided with ports and plugs where required to facilitate inspection and cleaning of the apparatus.

What I do claim and desire to obtain by Letters Patent of the United States of America is:—

1. In a milking machine, a pressure and vacuum pump and pulsating releaser, a slide valve pulsator, and means connecting the pump with the pulsator whereby to effect the application of vacuum to one end of the pulsator valve simultaneously with the application of compressed air to the other end of the valve for the purpose of operating the latter.

2. In a milking machine, a double acting pressure and vacuum pump, a pulsating releaser, a slide valve pulsator, and means connecting the pump with the pulsator whereby at each stroke of the pump piston compressed air is applied to one end of the pulsator valve while the other end of the latter is simultaneously placed under vacuum.

3. In a milking machine, a double acting pressure and vacuum pump, a pulsating releaser, a double acting slide valve pulsator, and means connecting the pump with the pulsator whereby at each stroke of the pump piston compressed air is applied to one end of the pulsator valve while the other end of the latter is simultaneously placed under vacuum.

4. A milking machine as claimed in claim 1, characterized by the provision of means connecting the pump with the pulsating releaser and non-return valves located in said connecting means to prevent air entering the releaser from the pump.

5. A milking machine as claimed in claim 1, characterized in that the connecting means connects the opposite ends of the pump with the opposite ends of the pulsator, means connecting the first connecting means with the vacuum chamber of the pulsating releaser, and non-return valves in the last mentioned connecting means between the pulsator and releaser.

6. A milking machine as claimed in claim 1, characterized in that the connecting means connects the opposite ends of the pump with the opposite ends of the pulsator, means connecting the first connecting means with the vacuum chamber of the pulsating releaser, and non-return valves in the last mentioned connecting means between the pulsator and releaser, and pressure escape valves smaller than the non-return valves in the connection between the pump and the pulsator.

7. A milking machine comprising a pressure and vacuum pump, a pair of pulsating releasers, connected together by a pipe the ends of which project into the releasers and are fitted with flap valves, a milk pipe from teat cups communicating with the releaser connecting pipe, a pulsation pipe from a releaser to teat cups, pipes from the pump ends each communicating with a releaser and a pulsator casing, air pipes from the pulsator to the releasers, and non-return valves fitted in the pipes from the pump ends, between the pulsator connections and the releasers.

8. In a milking machine, a pressure and vacuum pump, a pulsating releaser including upper and lower chambers, and a single pulsator, means for connecting the pulsator with the outer spaces of teat cups, means connecting the pulsator with the lower chamber of the releaser for effecting pulsation therein, means connecting the pulsator with the upper chamber of the releaser to constantly maintain the latter under vacuum, and means for actuating the pulsator.

In testimony whereof I have affixed my signature.

SYDNEY HERBERT KNAPP.